Patented July 21, 1942

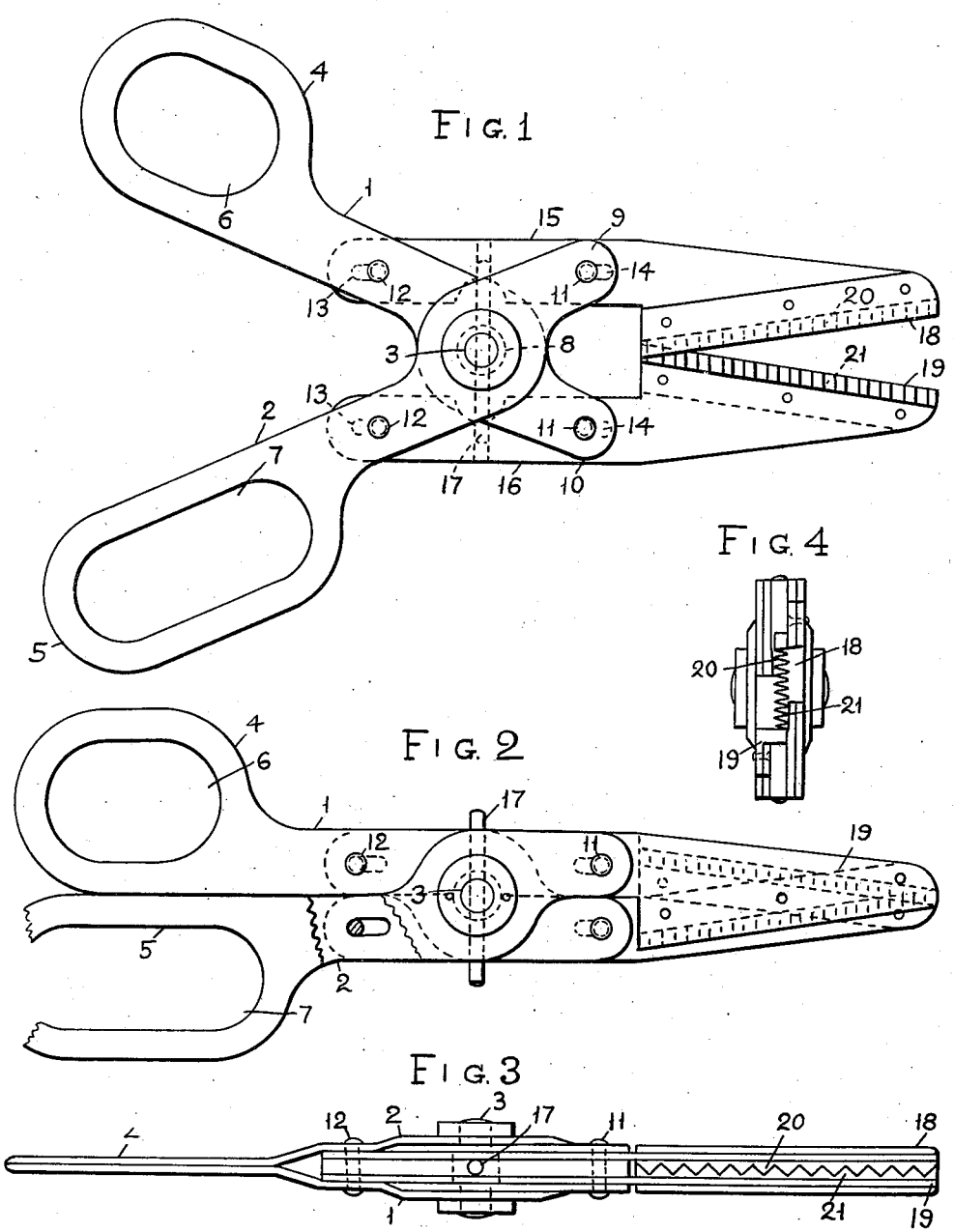

2,290,203

UNITED STATES PATENT OFFICE 2,290,203

PINKING SHEARS

John P. Nikonow and Elmon C. Gillette, New York, N. Y.

Application September 5, 1941, Serial No. 409,698

12 Claims. (Cl. 30—230)

Our invention relates to pinking shears and has particular reference to shears for cutting fabric and other sheet materials in a zig-zag line.

The main object of our invention is to provide a portable, manually operable tool with pinking jaws or cutting elements movable in parallel relation to each other, straight toward each other so that the cutting teeth can be provided with straight sides. Such an arrangement simplifies the manufacturing of the shears, making it also possible to obtain a high degree of accuracy in the cutting operation.

Another object of my invention is to arrange the jaws in such a manner that the opposite teeth successively mesh with each other, beginning with the first few teeth which are always in mesh. The jaws are made for this purpose with diverging opening.

Our invention is more fully described in the accompanying specification and drawing, in which:

Fig. 1 is a side view of the shears in an open position;

Fig. 2 is a similar view of the shears in a closed position;

Fig. 3 is an edge view of the same; and

Fig. 4 is an end view of the shears in an open position.

Our shears consist of members 1, 1 and 2, 2 connected together by a central pivot or pin 3 and having handles 4 and 5 with openings 6, 7 for an operator's fingers. The members 1, 1 and 2, 2 are joined together at the handles and are spread apart over a central enlarged portion 8 of the pin 3, members 2 being on the outside of the members 1. The members 1 and 2 have extensions 9, 9 and 10, 10 joined together by pins 11, 11. Similar pins 12, 12 join together the members 1, 1 and 2, 2, all these pins being placed at the same angular and radial distances apart. The pins pass through slots 13, 14 in bars 15, 16, so that the bars are drawn together when the handles are moved toward each other. In order to cause the bars to move straight toward each other, a guiding rod 17 is provided, passing through the enlargement 8 of the pin and sliding in corresponding holes in the bars 15, 16. The bars therefore move in a parallel relation to each other and also straight toward each other.

Jaws 18, 19 are attached to the outer or front ends of the bars 15, 16 with teeth 20, 21 at the sides. The jaws diverge outward, forming an opening at the front ends, the teeth at the rear ends being in mesh all the time. The teeth gradually come into mesh as the jaws are moved toward each other, cutting a sheet material such as fabric, leather, paper, etc., placed between the jaws, on a zig-zag line.

The upper teeth are tapered so that their points engage first the material or work between the jaws, thereby facilitating the cutting operation.

For sharpening the teeth it is sufficient to grind the sides. The upper and lower teeth are strictly parallel as regards their sides and projecting portions, so that all teeth have exactly the same shape.

It is evident that the teeth can be made of any desired shape, such as shown in the drawing, or rounded for obtaining a scalloped effect, etc.

The jaws 18, 19 are shown attached to the bars 15, 16, as by rivets, but it is understood that the jaws or teeth can be made integral with the bars.

It is understood that our pinking shears may be further modified without departing from the spirit of the invention, as set forth in the appended claims.

We claim as our invention:

1. Pinking shears comprising two members, a pivot connecting the middle portions of the members on the longitudinal axis of the shears, handles at the ends of the members at one side of the pivot, bars movably supported on the members, jaws on the ends of the bars at the other side of the pivot, the jaws diverging outward, teeth at the sides of the jaws, the teeth of one jaw being adapted to successively mesh with the teeth of the other jaw when the bars are moved toward each other, the teeth of one jaw being parallel to the teeth of the other jaw, and means to maintain the bars and the teeth of the opposite jaws in a parallel relation and moving in a straight path normal to the longitudinal axis of the shears.

2. Pinking shears comprising two members, a pivot connecting the middle portions of the members on the longitudinal axis of the shears, handles at the ends of the members at one side of the pivot, bars movably supported on the members, the bars having slots equally spaced to the rear and to the front of the pivot, pins extending into the slots from the members, the bars being thereby adapted to be moved toward each other by the members while maintaining a parallel relation to each other, a guiding rod extending through the pivot, the ends of the rod being slidably fitted in the bars, diverging jaws at the ends of the bars, and cutting elements on the jaws, the elements of one jaw being adapted to slidably engage the elements of the other jaw when the bars with the jaws are moved together, the elements having straight parallel side edges.

3. Pinking shears comprising two bars, elongated members, a pivot connecting together the bars between the members, the members having sliding pivotal connections with the bars at the front and at the rear of the pivot, means to manually move the bars together, a straight guiding member for maintaining the bars in parallel relation and moving directly toward each other in a straight path, extensions on the bars, and cutting elements on the extensions, the elements of one bar being adapted to slidably engage the elements of the other bar when the bars are moved together.

4. Pinking shears comprising two bars, elongated members, a pivot connecting together the bars between the members, the members having sliding pivotal connections with the bars at the front and at the rear of the pivot, means to manually move the bars together, a guiding member for maintaining the bars in parallel relation and moving directly toward each other, diverging extensions on the bars, and cutting elements at the inner sides of the bars adapted to slidably and successively engage each other when the bars are moved together.

5. Pinking shears comprising two bars, members pivotally connected together at their middle points between the bars, the front and rear ends of the members having sliding pivoted connections with the bars, diverging jaws at the ends of the bars having cutting elements, means to manually move the bars toward each other, thereby causing the cutting elements of one bar to slidably and successively engage the corresponding cutting elements of the other bar, and means to cause the bars to move in a straight path toward each other, the side edges of the cutting elements of one jaw being straight and parallel to the side edges of the cutting elements of the other jaw.

6. Pinking shears comprising two bars, members pivotally connected together at their middle points between the bars, the ends of the members having sliding pivoted connections with the bars for causing the bars to move in a parallel relation to each other, cutting elements at the ends of the bars, the elements of one bar being adapted to slidably engage the elements of the other bar for cutting a sheet material placed between the bars, a straight member slidably engaging the bars for causing the bars to move in a straight path toward each other, the elements having straight side cutting edges parallel to each other, and means to move the bars together.

7. Pinking shears comprising two bars, members pivotally connected together at their middle points between the bars, the ends of the members having sliding pivoted connections with the bars for causing the bars to move in a parallel relation to each other, a plurality of cutting teeth having straight side edges at the ends of the bars, the teeth of one bar being adapted to slidably engage the teeth of the other bar for cutting a sheet material placed between the bars, a straight member slidably engaging the bars for causing the bars to move in a straight path toward each other, and means to manually move the bars together.

8. Pinking shears comprising two bars, members having sliding and pivoted connections at their ends with the bars, means to pivotally connect together the middle portions of the members for causing the bars to move in parallel relation to each other, jaws at the ends of the bars, teeth at the sides of the jaws having straight parallel side edges slidably engaging each other when the bars are moved together, a sliding connection between the bars for causing the bars to move in a straight path toward each other, and means to move the bars toward each other.

9. Pinking shears comprising two bars, members having pins at their ends slidably engaging parallel slots in the bars, means to pivotally connect together the middle portions of the members, the pins being equally spaced from the central pivoting means, the bars being thereby adapted to move in a parallel relation to each other, diverging jaws at the ends of the bars, teeth at the sides of the jaws having straight parallel side edges slidably engaging each other when the bars are moved together, a straight member attached at the middle to the pivoting means and slidably engaging the bars for causing the bars to move in a straight path toward each other, and means to move the bars toward each other.

10. Pinking shears comprising two bars, members pivotally connected together at their middle points between the bars, the ends of the members having sliding pivoted connections with the bars for causing the bars to move in a parallel relation to each other, a plurality of cutting teeth having straight side edges at the ends of the bars, the teeth of one bar being adapted to slidably engage the teeth of the other bar for cutting a sheet material placed between the bars, a straight member slidably engaging the bars for causing the bars to move in a straight path toward each other, and means to manually move the bars together, the teeth of one bar being tapered so as to advance the points of the teeth for engaging the sheet material.

11. Pinking shears comprising two bars, members pivotally connected together at their middle points between the bars, the ends of the members having sliding pivoted connections with the bars for causing the bars to move in a parallel relation to each other, a plurality of cutting teeth at the ends of the bars, the teeth being of a zig-zag shape in the plane transverse to the plane of movement of the bars and having parallel straight side edges slidably engaging each other when the bar are moved together for cutting a sheet material placed between the teeth, a straight member slidably engaging the bars for causing the bars to move in a straight path toward each other, and means to manually move the bars.

12. Pinking shears comprising two bars, members having sliding and pivoted connections at their ends with the bars, means to pivotally connect together the middle portions of the members for causing the bars to move in parallel relation to each other, jaws at the ends of the bars, teeth at the sides of the jaws having straight parallel side edges slidably engaging each other when the bars are moved together, means to cause the bars to move in a straight path toward each other, and means to move the bars toward each other, the edges of the jaws with the teeth diverging along the lines at an angle to the axes of the bars.

JOHN P. NIKONOW.
ELMON C. GILLETTE.